(12) United States Patent
Batson (10) Patent No.: US 11,859,160 B2
(45) Date of Patent: Jan. 2, 2024

(54) OVAL-SHAPED METAL TANK SYSTEMS

(71) Applicant: Spokane Industries, Spokane, WA (US)

(72) Inventor: Nathan Scott Batson, Colbert, WA (US)

(73) Assignee: Spokane Stainless Technologies, Inc., Spokane, WA (US)

( * ) Notice: Subject to any disclaimer, the term of this patent is extended or adjusted under 35 U.S.C. 154(b) by 1049 days.

(21) Appl. No.: 16/719,820

(22) Filed: Dec. 18, 2019

(65) Prior Publication Data

US 2021/0189307 A1 Jun. 24, 2021

(51) Int. Cl.
| | |
|---|---|
| *C12G 1/02* | (2006.01) |
| *C12G 1/022* | (2006.01) |
| *B60K 15/03* | (2006.01) |
| *B01D 5/00* | (2006.01) |
| *B23K 103/04* | (2006.01) |
| *B61D 5/02* | (2006.01) |
| *F04B 39/06* | (2006.01) |
| *F22B 37/22* | (2006.01) |

(52) U.S. Cl.
CPC ............ *C12G 1/0203* (2013.01); *B60K 15/03* (2013.01); *B01D 5/0018* (2013.01); *B01D 5/0021* (2013.01); *B23K 2103/05* (2018.08); *B61D 5/02* (2013.01); *F04B 39/064* (2013.01); *F22B 37/222* (2013.01)

(58) Field of Classification Search
CPC .. C12G 1/0203; B60K 15/03; B23K 2103/05; F04B 39/064; F22B 37/222

USPC .......................................................... 99/276
See application file for complete search history.

(56) References Cited

U.S. PATENT DOCUMENTS

| | | | | | |
|---|---|---|---|---|---|
| 3,910,172 | A | * | 10/1975 | Jaegle ................... | C12C 11/006 134/169 R |
| 4,079,760 | A | * | 3/1978 | Hurst ....................... | B61D 5/02 141/35 |
| 4,242,878 | A | * | 1/1981 | Brinkerhoff ........ | F04B 39/0005 165/47 |
| 4,444,625 | A | * | 4/1984 | Smith .................. | B01D 5/0018 165/110 |
| 5,171,514 | A | * | 12/1992 | Veronesi ............... | F22B 37/222 138/89 |
| 5,983,996 | A | * | 11/1999 | Romero .................... | F28B 9/10 165/114 |
| 6,837,147 | B2 | * | 1/2005 | Daniel ..................... | C12G 1/02 413/1 |
| 8,875,616 | B2 | * | 11/2014 | Roth ....................... | C12C 13/00 99/278 |
| 10,272,525 | B1 | * | 4/2019 | Buller .................... | B33Y 30/00 |
| 2003/0037911 | A1 | * | 2/2003 | Halse ................... | B01D 5/0027 165/110 |

(Continued)

*Primary Examiner* — Omar Flores Sanchez
(74) *Attorney, Agent, or Firm* — Lee & Hayes P.C.

(57) ABSTRACT

A tank includes a cone-shaped wall formed of steel and attached between a first dome-shaped surface formed of steel and a second dome-shaped surface formed of steel. The cone-shaped wall attached between the first dome-shaped surface and the second dome-shaped surface defines an oval-shape void of angled corners on the inside surface of tank such that, when a product contained in the tank is displaced, the product is displaced in a torus shaped vortex between the first dome-shaped surface and the second dome-shaped surface.

20 Claims, 11 Drawing Sheets

(56) References Cited

U.S. PATENT DOCUMENTS

| | | | |
|---|---|---|---|
| 2008/0175951 A1* | 7/2008 | Rule | C12G 1/02 426/15 |
| 2011/0024418 A1* | 2/2011 | Batson | B65D 90/585 220/211 |
| 2011/0094387 A1* | 4/2011 | Soto Porrua | C12C 13/00 62/307 |
| 2013/0199376 A1* | 8/2013 | Rule | C12G 1/02 99/275 |
| 2014/0238836 A1* | 8/2014 | Hsia | B01D 5/0018 202/185.1 |
| 2014/0326327 A1* | 11/2014 | Owen | B01F 27/091 137/15.07 |
| 2015/0203801 A1* | 7/2015 | Perez | C12G 1/02 426/11 |
| 2015/0218499 A1* | 8/2015 | Frye | C12C 11/006 99/276 |
| 2016/0010903 A1* | 1/2016 | Yu | B01D 53/261 62/474 |
| 2019/0055504 A1* | 2/2019 | Crosato | B30B 9/02 |
| 2021/0190058 A1* | 6/2021 | Takahashi | F04B 39/121 |

\* cited by examiner

OVAL-SHAPED METAL TANK SYSTEMS

BACKGROUND

Wine fermentation tanks formed of concrete exist that have an egg shape to help create a torus shaped vortex of fermenting wine. For example, egg-shaped concrete fermentation tanks exist that utilize the heat produced from fermenting wine to help convect the wine in a torus shaped vortex. However, because these egg-shaped fermentation tanks are formed of concrete, these tanks are extremely heavy, difficult to produce in large sizes, problematic to incorporate auxiliary wine fermentation components (e.g., manways, fittings, plumbing, etc.), and incapable of being cleaned. Thus, these concrete tanks are labor intensive, time consuming, difficult to clean, and costly. Moreover, because these concrete tanks are incapable of being cleaned, they are susceptible to "pinking" a white wine. For example, a white wine being produced in concrete tanks subsequent to producing a red wine is susceptible to having a discolored appearance (e.g., a blush color, a red blush color, etc.) or "pinking" that may be perceived as undesirable for winemakers and/or consumers.

Accordingly, there remains a need in the art for a tank that creates a torus shaped vortex of fermenting wine that is light weight, easily produced, less labor intensive to clean, and inexpensive.

SUMMARY

Fermentation tanks are configured to produce wine. Generally, the tanks include a metal cone-shaped wall attached between a metal top dome (e.g., a top head) and a metal bottom dome (e.g., a bottom head) that has an oval-shape (e.g., egg shape) void of angled corners on the inside surface of the tanks. When a product (e.g., wine, red wine, white wine, etc.) is displaced in the oval-shaped metal tank, the product is displaced in a torus shaped vortex between the top dome and the bottom dome. This summary is provided to introduce simplified concepts of oval-shaped metal tanks and a method of making oval-shaped metal tanks, which is further described below in the Detailed Description. This summary is not intended to identify essential features of the claimed subject matter, nor is it intended for use in determining the scope of the claimed subject matter.

In an embodiment, a tank includes a cone-shaped wall formed of a steel having a top perimeter attached to a perimeter of a first dome-shaped surface formed of the steel and a bottom perimeter attached to a perimeter of a second shaped surface formed of the steel. The cone-shaped wall attached to the first dome-shaped surface and the second domed shaped surface defining an oval-shape that is void of angled corners on the inside surface of the tank such that when a product contained in the tank is displaced, the product is displaced in a torus shaped vortex between the first dome-shaped surface and the second dome-shaped surface.

In an embodiment, a tank includes a first wall portion formed of a steel attached to a second wall portion formed of the steel, wherein the first wall portion attached to the second wall portion define a seam having an elliptical shape. The tank also includes a first dome-shaped surface being formed of the steel and a second domed shaped surface being formed of the steel. The first domed shaped surface being attached to a top perimeter of the first wall portion and the second domed shaped surface being attached to a bottom perimeter of the second wall portion. The first wall portion attached to the first dome-shaped surface and the second wall portion attached to the second dome-shaped surface defining an oval-shape void of angled corners on the inside surface of tank such when a product contained in the tank is displaced, the product is displaced in a torus shaped vortex between the first dome-shaped surface and the second dome-shaped surface.

In an embodiment, a tank includes a cone-shaped wall formed of a steel and attached between a first dome-shaped surface formed of the steel and a second dome-shaped surface formed of the steel. The cone-shaped wall attached between the first dome-shaped surface and the second dome-shaped surface defining an oval-shape void of angled corners on the inside surface of tank such that when a product contained in the tank is displaced, the product is displaced in a torus shaped vortex between the first dome-shaped surface and the second dome-shaped surface.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to oval-shaped metal tanks that create a torus shaped vortex of fermenting wine that are relatively lightweight, easily produced, less labor intensive to clean than compared to egg-shaped concrete tanks and are less costly than egg-shaped concrete tanks. Moreover, these oval-shaped metal tanks are not susceptible to discoloring an appearance or "pinking" (e.g., causing a blush color, a red blush color, etc.) of a white wine that is made in a tank subsequent to producing a red wine in the same tank.

In an embodiment, the tanks may include a cone-shaped wall formed of a steel attached to a first dome-shaped surface formed of the steel and a second dome-shaped surface formed of the steel. The cone-shaped wall attached to the first dome-shaped surface and the second dome-shaped surface define an oval-shape that is void of any angled corners on the inside surface of the tank. Because the oval-shape on the inside surface of the tank is void of any angled corners, this provides the necessary smooth arcuate egg-shaped inside surface to displace a product (e.g., wine, red wine, white wine, etc.) in a torus shaped vortex, which produces a continuous and gentle mix of the product void of any dead circulation areas during a fermentation of the product. The cone-shaped wall (e.g., tapered wall) may be narrower at the top of the cone-shaped wall relative to the bottom of the cone-shaped wall, which provides for compressing a cap (e.g., grape solids, skins, seeds, stems, etc.) throughout the fermentation of the product. Because the cone-shaped wall compresses the cap, this provides for a majority of the cap to remain submerged and in constant contact with the product. Mixing the product in the torus shaped vortex eliminates the need for any intervention by a user (e.g., winemaker, worker, etc.) to produce a complete and complex product. For example, a user may simply initiate the fermentation process, and the smooth arcuate egg-shaped inside surface causes the product to be displaced in the torus shaped vortex, but without user intervention to mix the product with lees, mix the product with yeast, etc. Stated otherwise, the torus shaped vortex may be started by a worker initiating the fermentation process in the tank that gently mixes the product such that the product is in constant gentle contact with the lees and the yeast, without intervention by a worker.

The tanks may include a cooling jacket attached to the cone-shaped wall. The cooling jacket may be attached to a top half of the cone-shaped wall. The cooling jacket may be thermostatically controlled. The cooling jacket may cool the product when the product encounters an inside top half surface of the cone-shaped wall. As the cooling jacket cools the product, the product is displaced down (e.g., sinks) toward the second domed shape surface (e.g., metal bottom dome, bottom head, etc.).

Because the oval-shape on the inside surface of the tank is void of any angled corners, this provides the smooth arcuate egg-shaped inside surface for the cooled product to be displaced down to the second domed shape surface without any dead circulation areas, which provides a homogeneous mixture of the product. Moreover, the exothermic reaction of the fermentation process provides for the product located at the center of the tank to remain warmer than the cooled product located at the inside surface of the tank, which provides for displacing the product back up towards the first domed shape surface (e.g., metal top dome, top head, etc.) at which point the product is again cooled by the cooling jacket to displace the product back down toward the second domed shape surface. During the fermentation of the product, the heating and cooling of the product displaces the product in the tank in the torus shaped vortex, which homogeneously mixes the product continuously and gently without any dead circulation areas to produce a complete and complex product.

The tanks may further include an oxygenation system (e.g., a micro-oxygenation system, micro-ox system, a macro-oxygenation system, etc.). The oxygenation system may provide for oxygenation of the product contained in the tank. For example, the oxygenation system may be inserted in the tank which has an oxygenation stone (e.g., stainless steel O2 stone, stainless diffusion stone, micro diffusion stone, oxygen aeration stone, oxygen stone, etc.) disposed proximate to the second domed shape surface. The oxygenation system may provide for piping controlled quantities of pure oxygen (O2) into the product contained in the tank.

The tanks may be formed of stainless steel. For example, one or more of the first domed shape surface, the second domed shape surface, and/or the cone-shaped wall may be formed of stainless steel. The use of stainless steel may reduce the weight of the tank so as to weigh about 80% less than similarly sized or capacity egg-shaped concrete fermentation tank. Therefore, the tank according to the instant disclosure may be more easily transported, set, and removed without specialized moving equipment required by the heavier egg-shaped concrete fermentation tanks. For example, a 1,600 liters (420 gallons) egg-shaped concrete fermentation tank weighs about 2 tons (~1800 kilograms), whereas a 1,600 liters metal tank weighs about 800 pounds (~360 kilograms). The elimination of the need for specialized moving equipment may significantly reduce the higher costs associated with concrete fermentation tanks.

Moreover, because the tanks may be formed of stainless steel, the tanks may be easily produced in larger sizes than egg-shaped concrete fermentation tanks. For example, because of the mass, weight, and/or casting limitations of concrete, the maximum size an egg-shaped concrete fermentation tank that has been produced using existing techniques is about 3,400 liters (900 gallons). In contrast, a size of an tank may be produced greater than about 38,000 liters (~10,000 gallons). Because the tanks may be produced in larger sizes than egg-shaped concrete fermentation tanks, the tanks provide for greater economies of scale for a user (e.g., wine maker) as compared to the egg-shaped concrete fermentation tanks. For example, the tanks provide for maximizing a yield of floor space by about 11 times more than the egg-shaped concrete fermentation tanks. Thus, a user may produce more volume of product in the same or smaller area of floor space with the tanks than a volume of product produced in the egg-shaped concrete fermentation tanks.

Further, because the tanks may be formed of stainless steel, the tanks may be more easily cleaned as compared to the egg-shaped concrete fermentation tanks. For example, the tanks are easily cleaned using typical cleaning protocols involving scrubbers, metal, hot water, ozone, chlorine, strong acids, and bases, whereas the egg-shaped concrete fermentation tanks are porous, which allows microbes and bacteria to lodge into these pores, and they are susceptible to being damaged by the scrubbers, metal, hot water, ozone, chlorine, strong acids, and bases.

Illustrative Oval-Shaped Metal Tank

Figure 1:
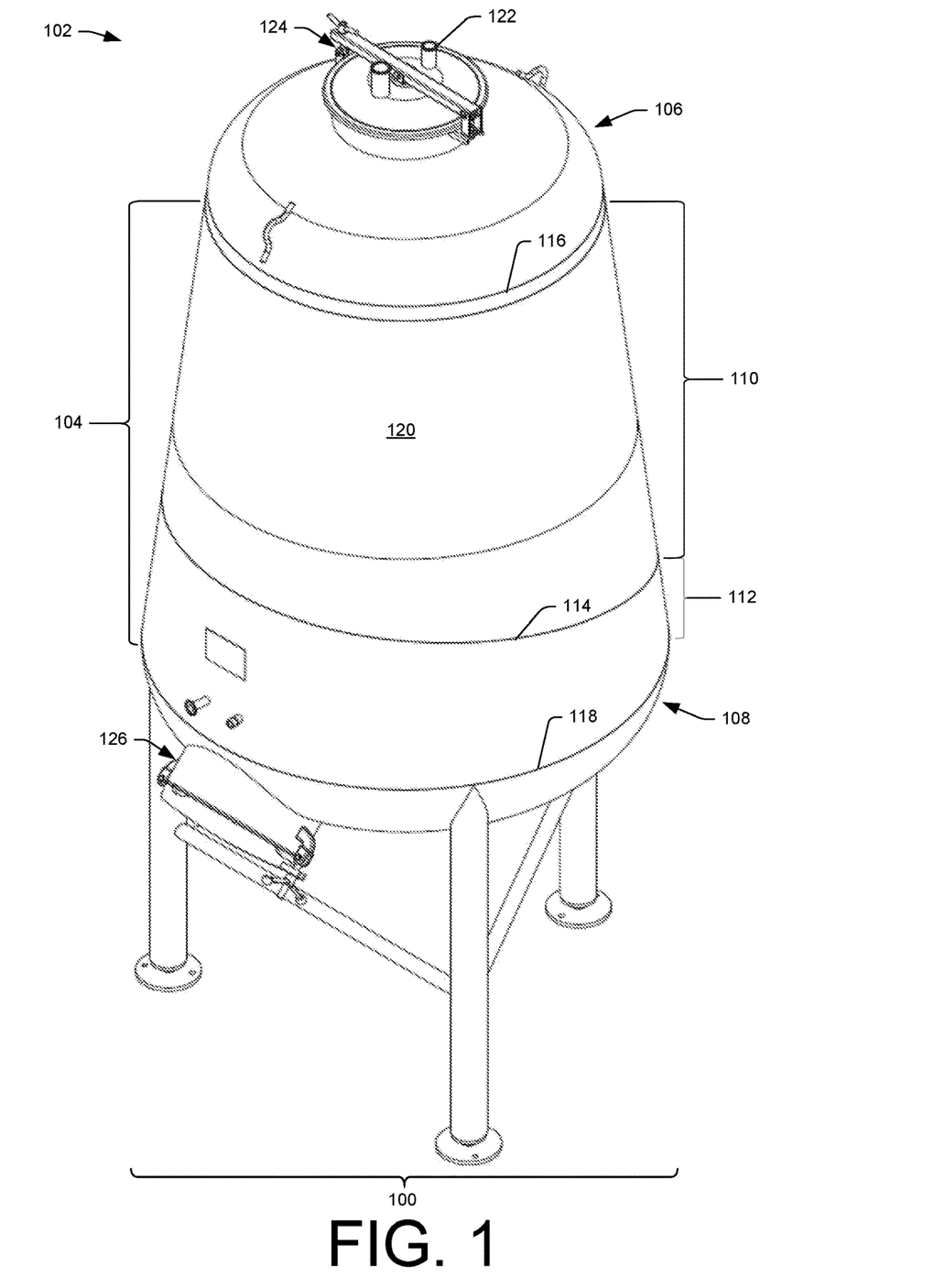
FIG. 1 illustrates a front, top, right-side perspective view of a tank according to an embodiment of this disclosure.

FIG. 1 illustrates a front, top, right-side perspective view 100 of an example tank 102. The tank 102 may be a fermentation tank such as a red wine fermenter for holding a juice, for example. The tank 102 may be an oval-shaped metal tank. In an embodiment, the tank 102 may include a cone-shaped wall 104 formed of a steel sheet attached between a first dome-shaped surface 106 formed of steel and a second dome-shaped surface 108 formed of steel. In one possible implementation, a size of the cone-shaped wall may have a height of about 66 inches. The first dome-shaped surface 106 may be a metal top dome (e.g., a top head) of the tank 102. The second dome-shaped surface 108 may be a metal bottom dome (e.g., a bottom head) of the tank 102.

The cone-shaped wall 104 may include a first wall portion 110 formed of the steel and attached to a second wall portion 112 formed of the steel. For example, the first wall portion 110 may be welded (e.g., seam welded) to the second wall portion 112. The first wall portion 110 attached to the second wall portion 112 may define a seam 114 having an elliptical shape. The elliptical shape of the seam 114 may circumnavigate the cone-shaped wall 104 convolutely (e.g., twisted, coiled, etc.) along a longitudinal length of the cone-shaped wall 104. Additionally, the first wall portion 110 may be attached to the second wall portion 112 such that the seam 114 is void of angled corners, steps, and/or flats on the inside surface of the tank 102.

The first wall portion 110 has a top perimeter 116 and the second wall portion has a bottom perimeter 118 opposite the top perimeter 116. The top perimeter 116 of the first wall portion 110 may be attached to a perimeter of the first dome-shaped surface 106. For example, the top perimeter 116 of the first wall portion 110 may be welded (e.g., seam welded) to the perimeter of the first dome-shaped surface 106. The top perimeter 116 of the first wall portion 110 may be attached to the perimeter of the first dome-shaped surface 106 such that the attachment is void of angled corners, steps, and/or flats on the inside surface of the tank 102. The bottom perimeter 118 of the second wall portion 112 may be attached to a perimeter of the second dome-shaped surface 108. For example, the bottom perimeter 118 of the second wall portion 112 may be welded (e.g., seam welded) to the perimeter of the second dome-shaped surface 108. The bottom perimeter 118 of the second wall portion 112 may be attached to the perimeter of the second dome-shaped surface 108 such that the attachment is void of angled corners, steps, and/or flats on the inside surface of the tank 102. In this way, an inside surface of the tank 102 has an oval-shape (e.g., egg shape) void of angled corners on the inside surface of tank 102 such that when a product contained in the tank 102 is displaced, the product is displaced in a torus shaped vortex between the first dome-shaped surface 106 and the second dome-shaped surface 108.

In an embodiment, the tank 102 may include a cooling jacket 120 attached to the cone-shaped wall 104. For example, the cooling jacket 120 may be attached to a top half of the cone-shaped wall 104. In another example, the cooling jacket 120 may be attached to the first wall portion 110 of the cone-shaped wall 104.

The tank 102 may further include fitting(s) 122. One or more of the fittings 122 may be an oxygenation port. The oxygenation port may receive at least a portion of an oxygenation system (e.g., a micro-oxygenation system, micro-ox system, a macro-oxygenation system, etc.) (not shown). For example, an oxygenation system may be inserted into the tank 102 via the fitting 122 such that an oxygenation stone (e.g., stainless steel O2 stone, stainless diffusion stone, micro diffusion stone, oxygen aeration stone, oxygen stone, etc.) (not shown) may be disposed proximate to the second domed-shaped surface 108. In one example, the fitting 122 may be disposed in the first dome-shaped surface 106 (not depicted). In another example, the fitting 122 may be disposed in a manway assembly 124 attached to the first dome-shaped surface 106 (depicted in FIG. 1). The tank 102 may include a manway assembly 126 attached to the second dome-shaped surface 108.

Figure 2:
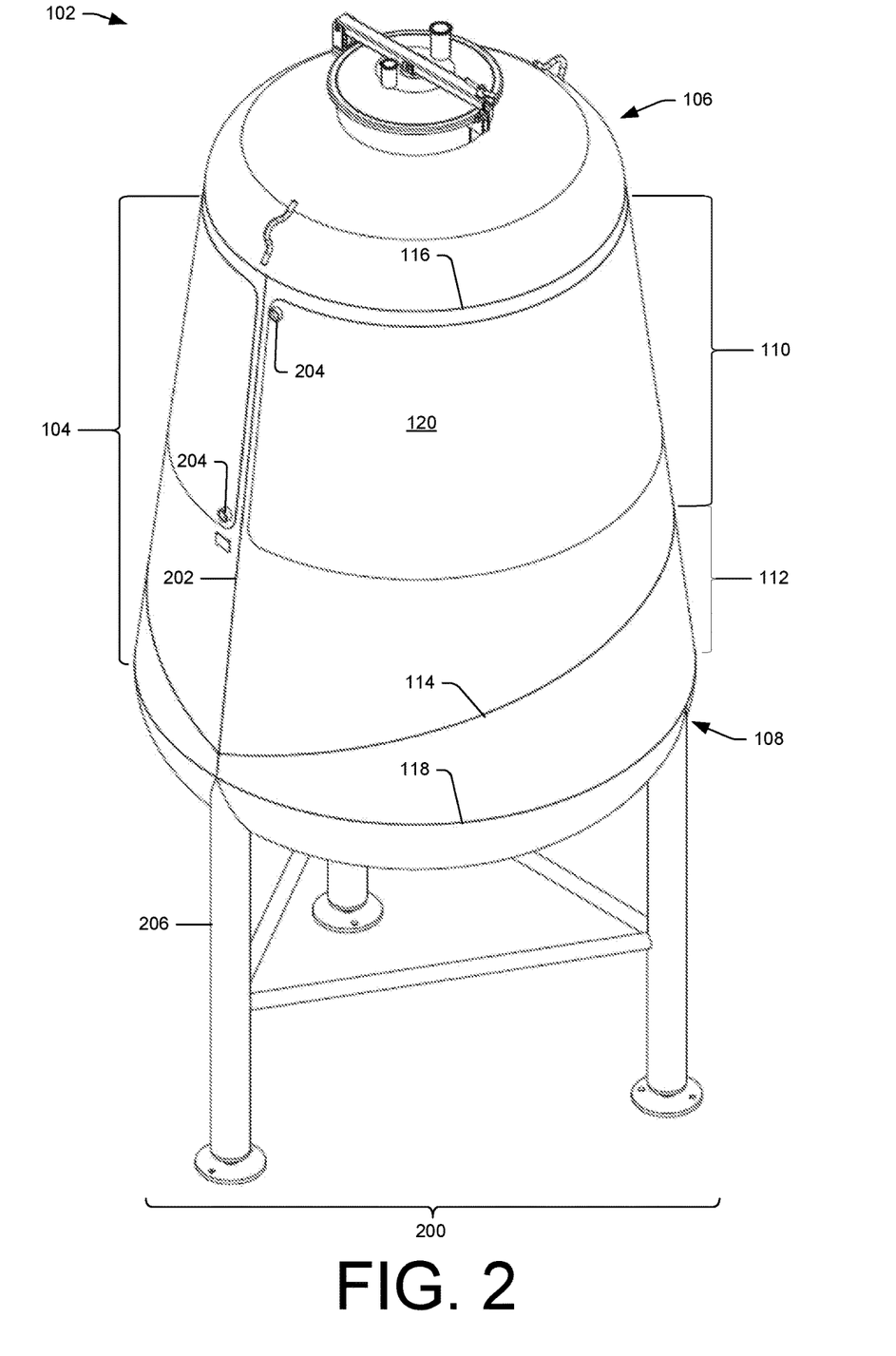
FIG. 2 illustrates a back, top, left-side perspective view of the tank shown in FIG. 1.

FIG. 2 illustrates a back, top, left-side perspective view 200 of the tank 102 shown in FIG. 1. FIG. 2 illustrates the cone-shaped wall 104 of the tank 102 may include a seam 202. For example, a first vertical edge of the cone-shaped wall 104 may be attached to a second vertical edge of the cone-shaped wall 104. For example, the first vertical edge of the cone-shaped wall 104 may be welded (e.g., seam welded) to the second vertical edge of the cone-shaped wall 104. The seam 202 of the cone-shaped wall 104 may extend rectilinearly along a longitudinal length of the cone-shaped wall 104.

The cooling jacket 120 may have the same cone shape as the cone-shaped wall 104 to provide for interfacing with the outside surface of the cone-shaped wall 104. For example, the top perimeter 116 of the cone-shaped wall 104 may be narrower relative to the bottom perimeter 118 of the cone-shaped wall 104, and the cooling jacket 120 may have a cone shape (e.g., tapered shape) having a narrower top perimeter relative to a bottom perimeter that are equal to the top perimeter 116 and bottom perimeter 118 of the cone-shaped wall 104 to fit on the cone shape of the exterior surface of the cone-shaped wall 104.

The cooling jacket 120 may include one or more ports 204 (only two are depicted). The one or more ports 204 may provide for a coolant (e.g., glycol coolant) to be pumped through the cooling jacket 120. One of the one or more ports 204 may be an "in" port and one of the one or more ports 204 may be an "out" port located in the cooling jacket 120 to maximize a flow rate of the coolant through the cooling jacket 120. The flow rate be about 5 gallons per minute (gpm) at about 50 pounds per square inch (psi). The cooling jacket 120 may be a resistance spot-welded dimpled jacket attached to the outside surface of the cone-shaped wall 104. The cooling jacket 120 may have a gap of about 0.08 inches between the outside surface of the cone-shaped wall 104 and the inside surface of the cooling jacket 120 facing the outside surface of the cone-shaped wall 104. For example, the cooling jacket 120 may be pillowed (e.g., inflated) to provide a gap of about 0.08 inches between the outside surface of the cone-shaped wall 104 and the inside surface of the cooling jacket 120 facing the outside surface of the cone-shaped wall 104. The coolant may be pumped through the cooling jacket 120 (e.g., through the gap between the outside surface of the cone-shaped wall 104 and the inside surface of the cooling jacket 120) via a refrigeration system. For example, the coolant may be pumped through the cooling jacket 120 via a central refrigeration system of a winery. The temperature of the cooling jacket 120 may be controlled via a tank monitoring system. The temperature of the cooling jacket 120 may be determined by a winemaker, which may be dependent upon a type of grape, a type of yeast, and/or a type of wine being produced.

In one implementation, a size of the tank 102 may have a minimum outside diameter of about 48 inches and a maximum diameter of about 64 inches. For example, in an implementation, the top perimeter 116 of tank 102 may have a minimum outside diameter of about 48 inches and the bottom perimeter 118 of the tank 102 may have a maximum diameter of about 64 inches. A tank having components with the dimensions described herein may have a volume of about 950 gallons. While the specification describes a tank having a minimum outside diameter of about 48 inches, a maximum diameter of about 64 inches, and a volume of about 950 gallons, it is contemplated that the tank may be of any size and or shape.

In an alternative implementation, a size of the tank 102 may have a minimum diameter smaller than 48 inches, a maximum diameter smaller than 64 inches, and a volume less than 950 gallons. In this example, where the tank 102 has a minimum diameter smaller than 48 inches, a maximum diameter smaller than 64 inches, and a volume less than 950 gallons, the cone-shaped wall 104 may not include both of the first wall portion 110 and the second wall portion 112. That is, in view of capabilities and/or limitations of standard manufactured sizes of stainless steel sheets, the cone-shaped wall 104 may with only a first wall portion 110 to form a tank having the volume less than 950 gallons.

In contrast, as indicated above, in an example where the minimum diameter is larger than 48 inches, the maximum diameter larger is than 64 inches, and the volume desired is greater than 950 gallons, the cone-shaped wall 104 may include one or more additional wall portions attached to the first wall portion 110 and/or the second wall portion 112. For example, because the tank 102 has a minimum diameter larger than 48 inches, a maximum diameter larger than 64 inches, and a volume greater than 950 gallons, the cone-shaped wall 104 may require one or more additional wall portions welded (e.g., seam welded) to the first wall portion 110 and/or the second wall portion 112 to form a tank having the volume greater than 950 gallons. The minimum diameter and the maximum diameter of the tank may depend on a desired volume of the tank 102, and the quantity of wall portions may depend on a desired volume of the tank.

The tank 102 having the volume of about 950 gallons may have a height of about 94 inches from the top outside surface of the first dome-shaped surface 106 to a bottom outside surface of the second dome-shaped surface 108. Notably, the tank 102 may have any height. The tank 102 may include support legs 206. For example, the tank 102 may include legs and/or bracing welded to the tank 102. A height of the tank 102 may be adjusted via the legs 206. In an implementation, a size of the tank 102 having the volume of about 950 gallons may have an overall height of about 142 inches.

Figure 3:
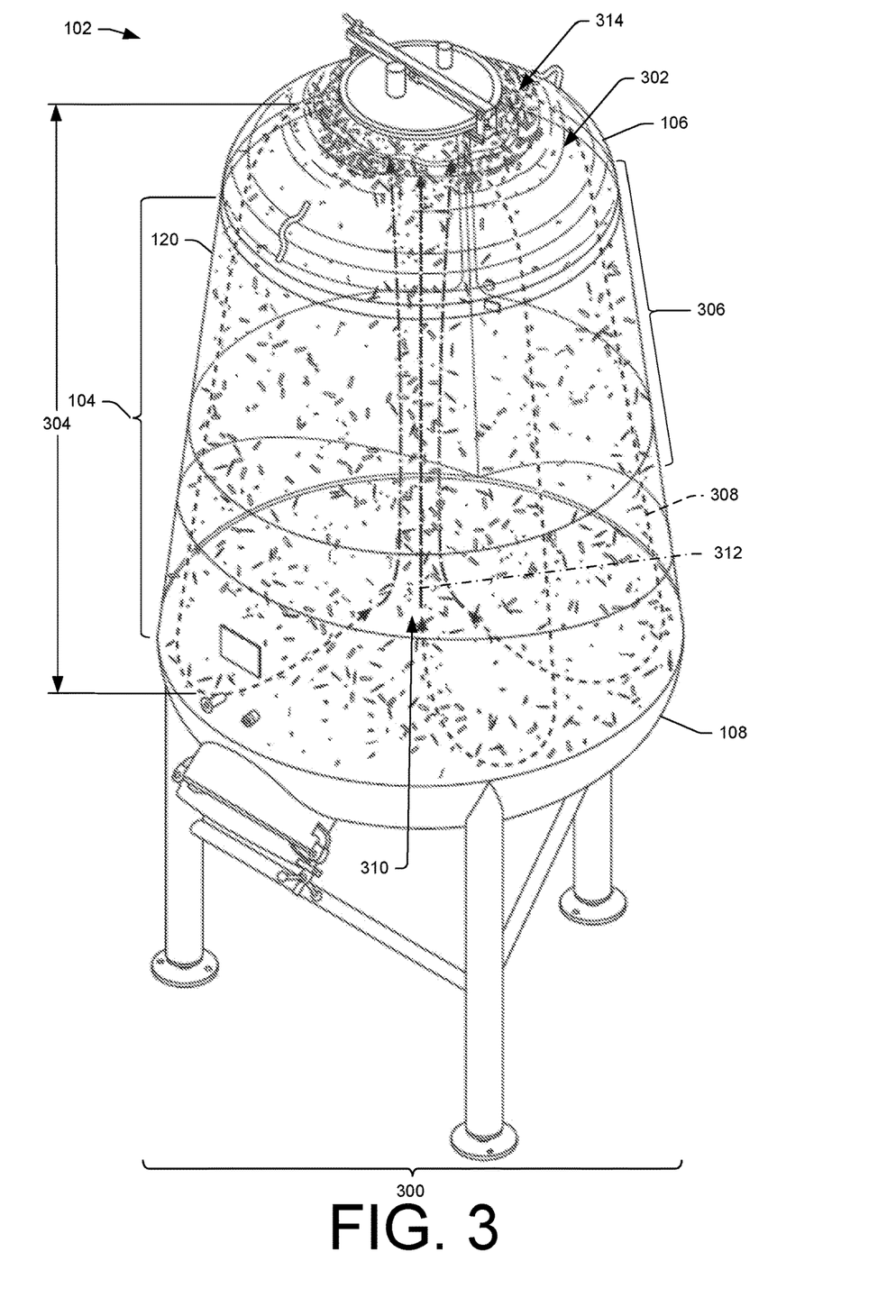
FIG. 3 illustrates a transparent view of the tank shown in FIG. 1 to depict a product being displaced in a torus shaped vortex within the tank.

FIG. 3 illustrates a transparent view 300 of the tank 102 shown in FIG. 1 to depict a product 302 being displaced in a torus shaped vortex 304 within the tank 102. FIG. 3 illustrates the first dome-shaped portion 106, the cone-shaped wall 104, and the cooling jacket 120 as being transparent to show displacement of the product 302. As the cooling jacket 120 attached to the cone-shaped wall 104 cools the product 302 encountering an inside top half surface 306 of the cone-shaped wall 104, the product 302 is displaced in a direction 308 down toward the second dome-shaped surface 108. As the exothermic reaction of the fermentation process of the product 302 releases heat, the product 302 located at a center 310 of the tank 102 is displaced in a direction 312 back up towards the first domed-shape surface 106. Thus, the exothermic reaction heating the product 302 and the cooling jacket 120 cooling the product 302 displaces the product 302 in the tank 102 in the torus shaped vortex 304, and homogeneously mixes the product 302 continuously and gently without any dead circulation areas to produce a complete and complex product 302. Because the first dome-shaped portion 106 of the cone-shaped wall 104 is narrower than the second dome-shaped portion 108 of the cone-shaped wall 104, a cap 314 of grape solids, skins, seeds, stems, etc. may be compressed and remain submerged in the product 302, such that the cap 314 is in constant contact with the product 302 throughout the fermentation of the product 302.

Figure 4:
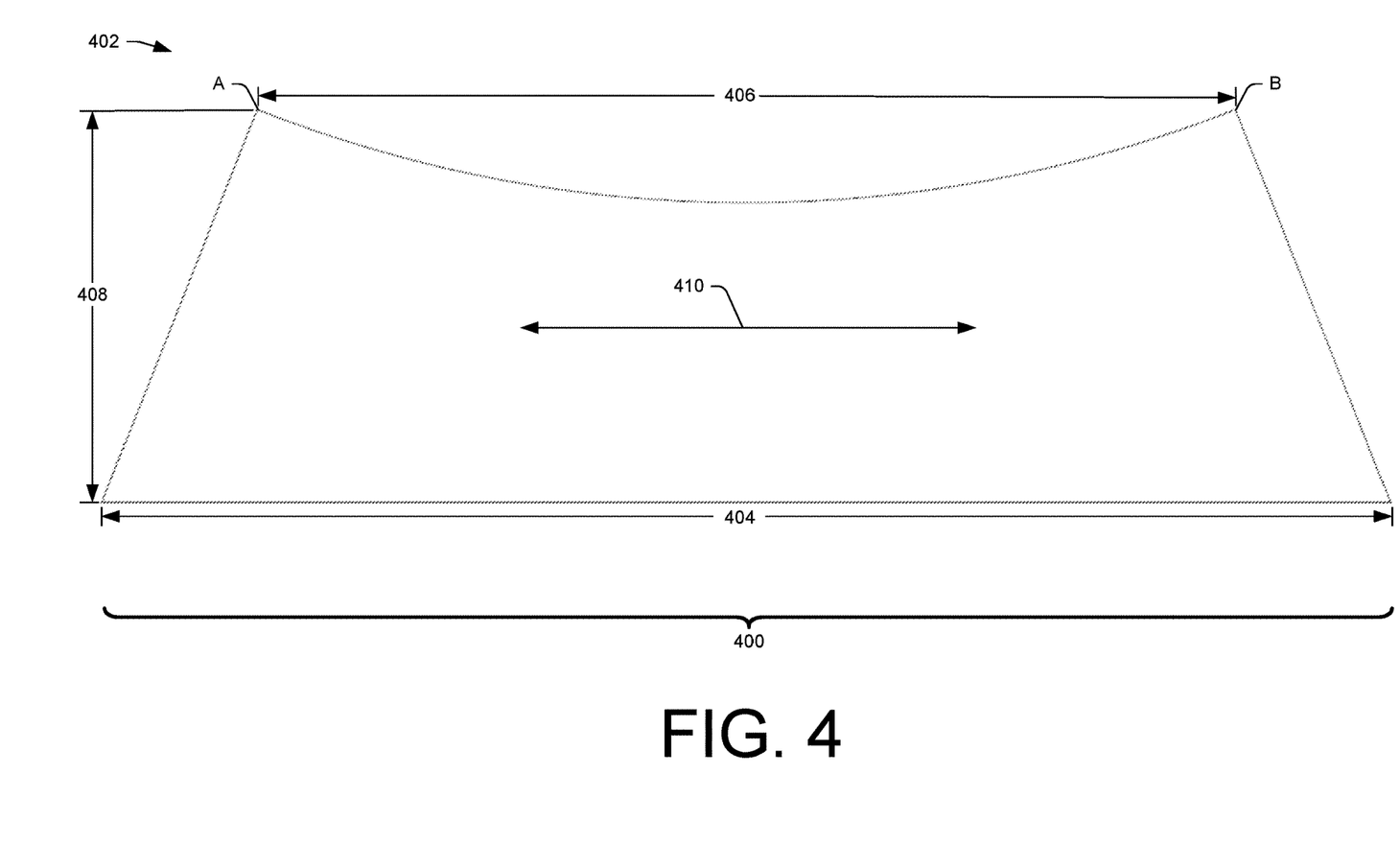
FIG. 4 illustrates a planar view of an example first wall portion of the tank shown in FIG. 1.

FIG. 4 illustrates a planar view 400 of an example first wall portion 402 of the tank 102 shown in FIG. 1. The first wall portion 402 may be the same as the first wall portion 110 shown in FIGS. 1 and 2. The first wall portion 402 may be cut from a coil stock. For example, the first wall portion 402 may be cut from a coil stock of 12 gauge (GA), steel (e.g., A240-T304 stainless steel (SS), #4 finish)). The coil stock may have a width of about 60 inches. For example, the standard coil stock width (e.g., largest width) available for purchase (e.g., off-the-shelf) may be 60 inches. The first wall portion 402 may have a bottom length 404 of about 194 inches. The first wall portion 402 may have a top length 406 of about 147 inches (i.e., straight line distance between point A and point B). The first wall portion 402 may have a width 408 of about 59 inches. The first wall portion 402 may have a grain direction 410 that is parallel to the bottom length 404 and/or the top length 406. The grain direction 410 of the first wall portion 402 may be the same as a grain direction of the 12 GA coil stock, where the grain direction of the 12 GA coil stock is in a direction of a roll of the 12 GA coil stock perpendicular to the width of the 12 GA coil stock.

Figure 5:
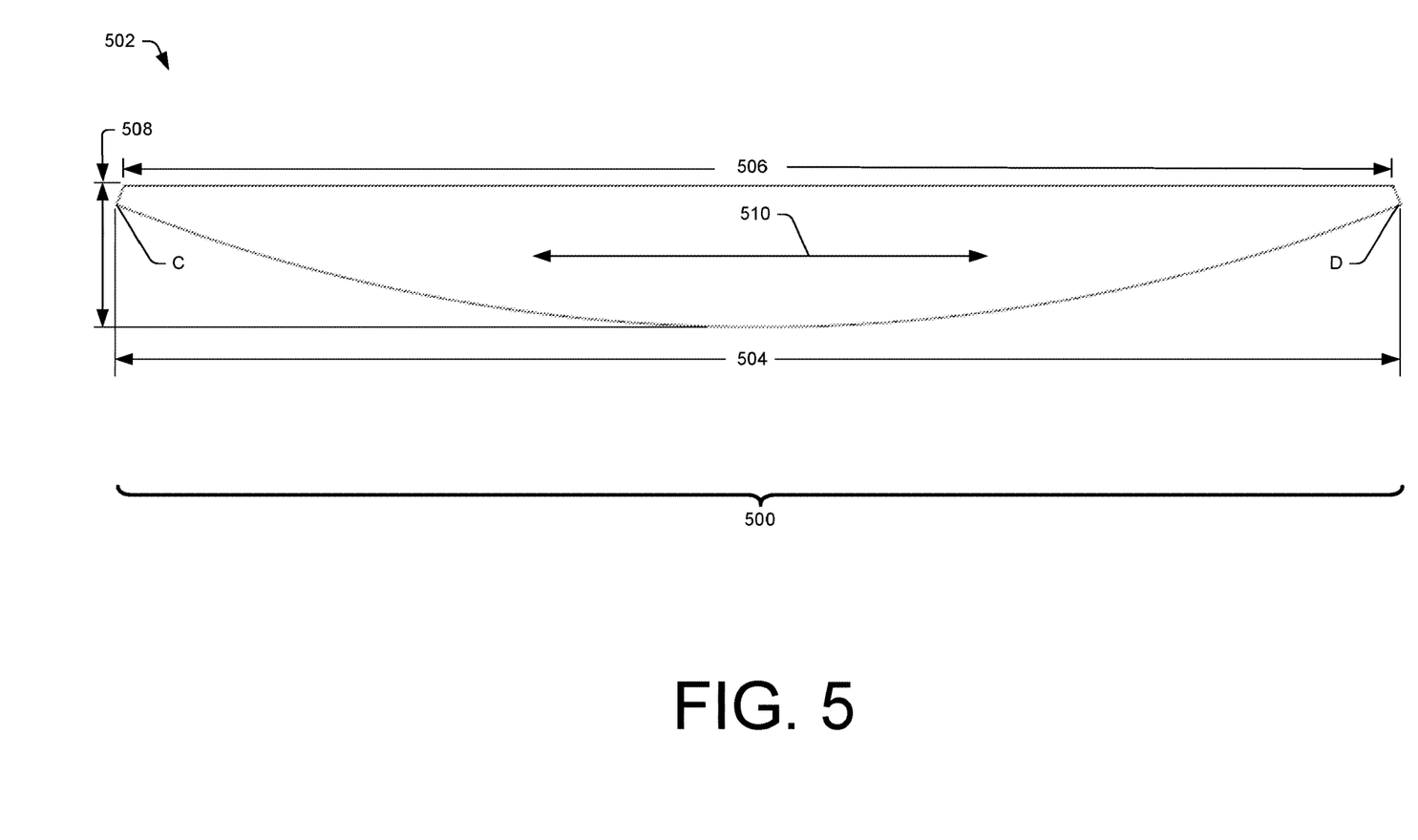
FIG. 5 illustrates a planar view of an example second wall portion of the tank shown in FIG. 1.

FIG. 5 illustrates a planar view 500 of an example second wall portion 502 of the tank 102 shown in FIG. 1. The second wall portion 502 may be the same as the second wall portion 112 shown in FIGS. 1 and 2. The second wall portion 502 may be cut from a coil stock. For example, the second wall portion 502 may be cut from a coil stock of 12 gauge (GA), steel (e.g., A240-T304 stainless steel (SS), #4 finish). The second wall portion 502 may have a bottom length 504 of about 196 inches (i.e., straight line distance between point C and point D). The second wall portion 502 may have a top length 506 of about 194 inches. The second wall portion 502 may have a width 508 of about 22 inches. The second wall portion 502 may have a grain direction 510 that is parallel to the bottom length 504 and/or the top length 506. The grain direction 510 of the second wall portion 502 may be the same as the grain direction 410 of the first wall portion 402.

Figure 6:
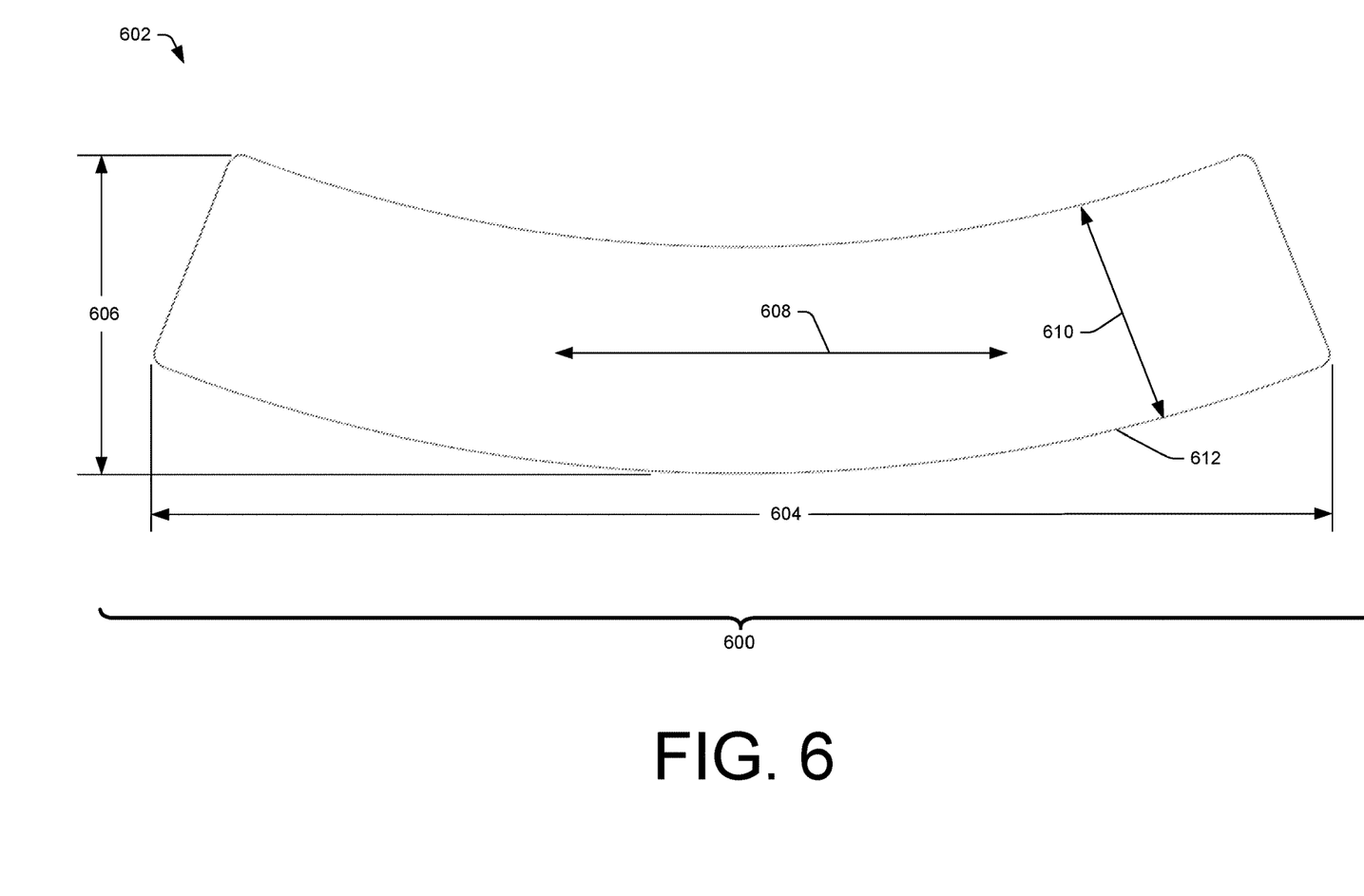
FIG. 6 illustrates a planar view of an example cooling jacket of the tank shown in FIG. 1.

FIG. 6 illustrates a planar view 600 of an example cooling jacket 602 of the tank 102 shown in FIG. 1. The cooling jacket 602 may be the same as the cooling jacket 120 shown in FIGS. 1 and 2. The cooling jacket 602 may be cut from a coil stock. For example, the cooling jacket 602 may be cut from a coil stock of 20 gauge (GA), steel (e.g., A240-T304 stainless steel (SS), #4 finish). The cooling jacket 602 may have a bottom length 604 of about 170 inches. The cooling jacket 602 may have a width 606 of about 46 inches. The cooling jacket 602 may have a grain direction 608 that is parallel to the bottom length 604. The grain direction 608 of the cooling jacket 602 may be the same as a grain direction of the 20 GA coil stock, where the grain direction of the 20 GA coil stock is in a direction of a roll of the 20 GA coil stock perpendicular to the width of the 20 GA coil stock. The cooling jacket 602 may have a width 610 of about 33 inches. The cooling jacket 602 may have a radius of about 469 inches.

Figure 7:
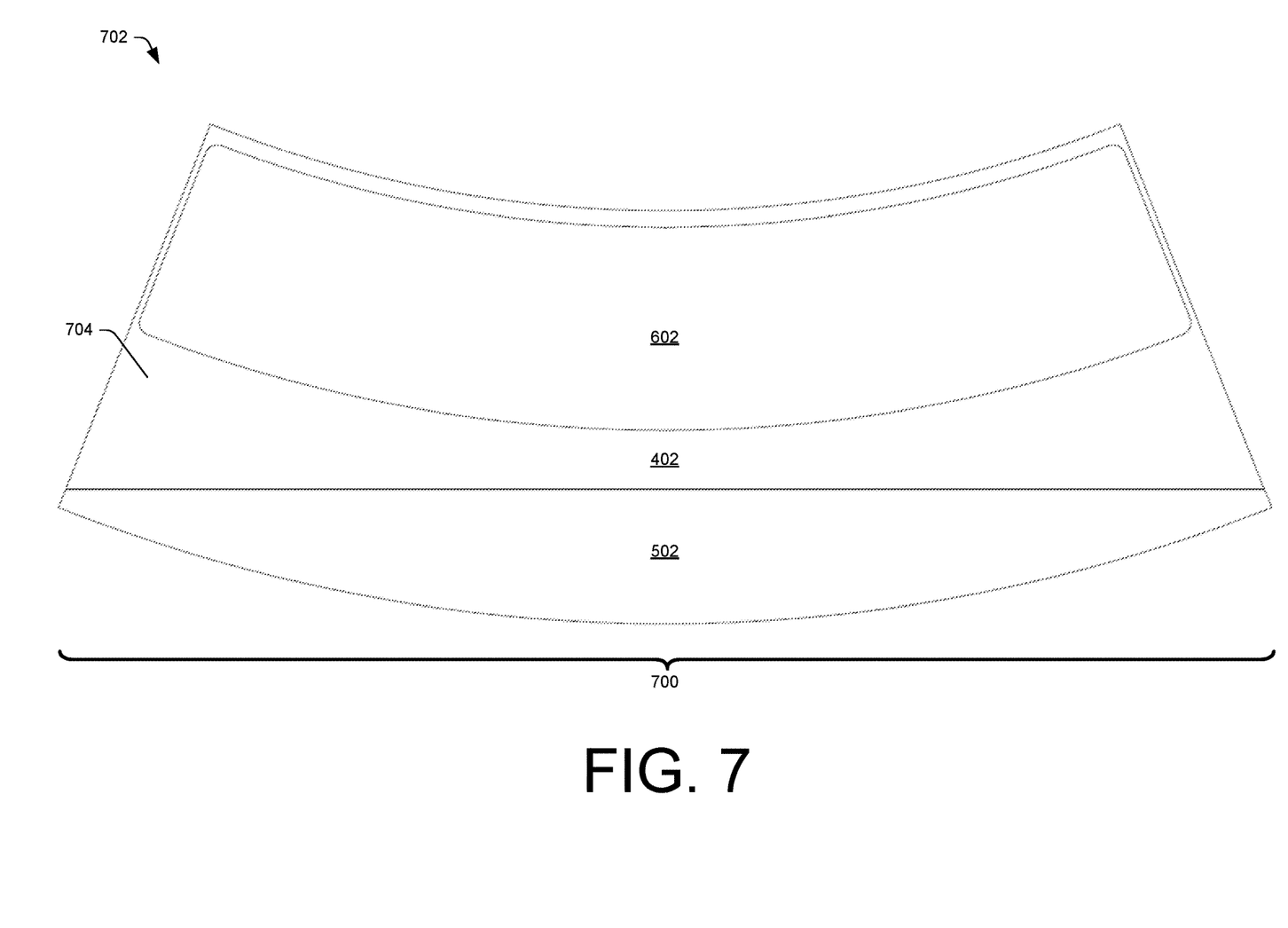
FIG. 7 illustrates a planar view of an example cone-shaped wall assembly including the first wall portion, the second wall portion, and the cooling jack shown in FIGS. 4, 5, and 6.

FIG. 7 illustrates a top view 700 of an example cone-shaped wall assembly 702 including the first wall portion 402, the second wall portion 502, and the cooling jacket 602 shown in FIGS. 4, 5, and 6. The cone-shaped wall assembly 702 may be the same as the cone-shaped wall 104 shown in FIGS. 1, 2, and 3. The bottom length 404 of the first wall portion 402 may be attached to the top length 506 of the second wall portion 502. For example, the bottom length 404 of the first wall portion 402 may be seam welded to the top length 506 of the second wall portion 502. The cooling jacket 602 may be attached to a top surface 704 of the first wall portion 402. For example, the cooling jacket 602 may be resistance spot welded to the top surface 704 of the first wall portion 402.

Figure 8:
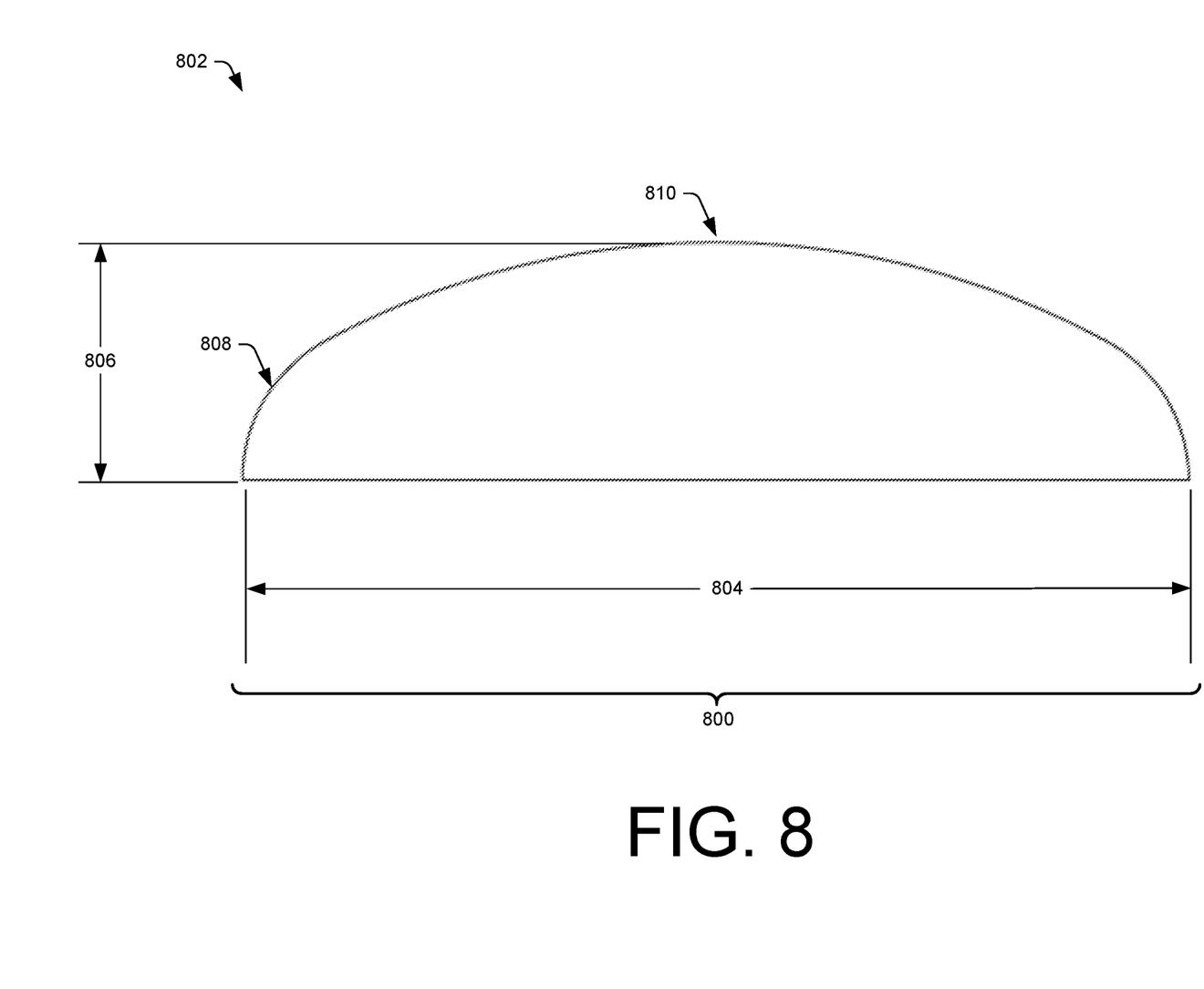
FIG. 8 illustrates a side view of an example first dome-shaped surface shown in FIG. 1.

FIG. 8 illustrates a side view 800 of an example first dome-shaped surface 802 shown in FIG. 1. The first dome-shaped surface 802 may be the same as the first dome-shaped surface 106 shown in FIGS. 1, 2, and 3. In an implementation, a possible size of the first dome-shaped surface 802 may have an outside diameter 804 of about 48 inches. The first dome-shaped surface 802 may have a height 806 of about 12 inches. The first dome-shaped surface 802 may have knuckle radius 808 of about 8 inches. The first dome-shaped surface 802 may have crown radius 810 of about 42 inches. The first dome-shaped surface 802 may be formed of a steel (e.g., A240-T304 stainless steel (SS)).

Figure 9:
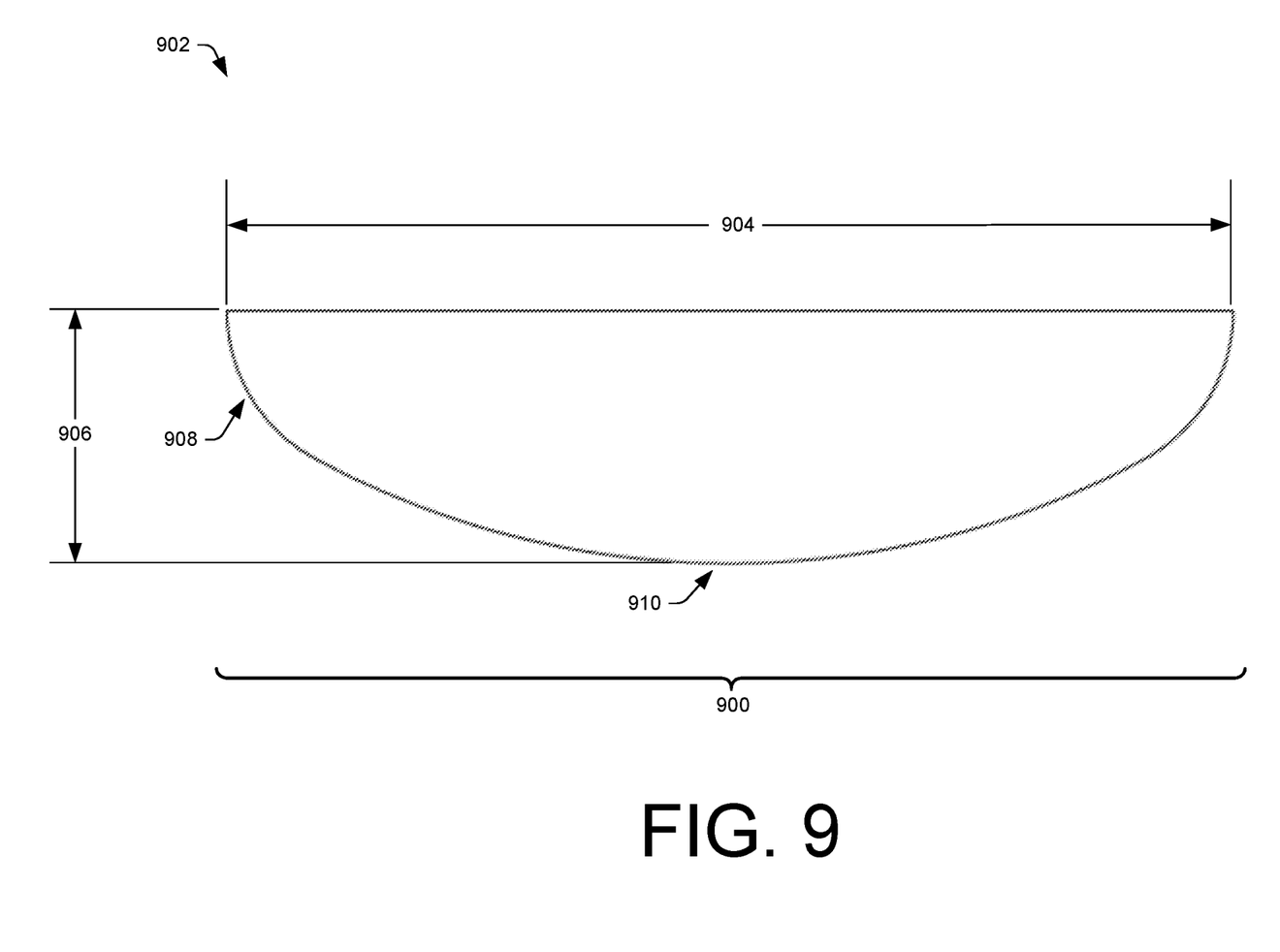
FIG. 9 illustrates a side view of an example second dome-shaped surface shown in FIG. 1.

FIG. 9 illustrates a side view 900 of an example second dome-shaped surface shown in FIG. 1. The second dome-shaped surface 902 may be the same as the second dome-shaped surface 108 shown in FIGS. 1, 2, and 3. The second dome-shaped surface 902 may have an outside diameter 904 of about 64 inches. The second dome-shaped surface 902 may have a height 906 of about 17 inches. The second dome-shaped surface 902 may have knuckle radius 908 of about 12 inches. The second dome-shaped surface 902 may have crown radius 910 of about 56 inches. The second dome-shaped surface 902 may be formed of a steel (e.g., A240-T304 stainless steel (SS)).

Example Method of Making an Oval-Shaped Metal Tank

Figure 10A:
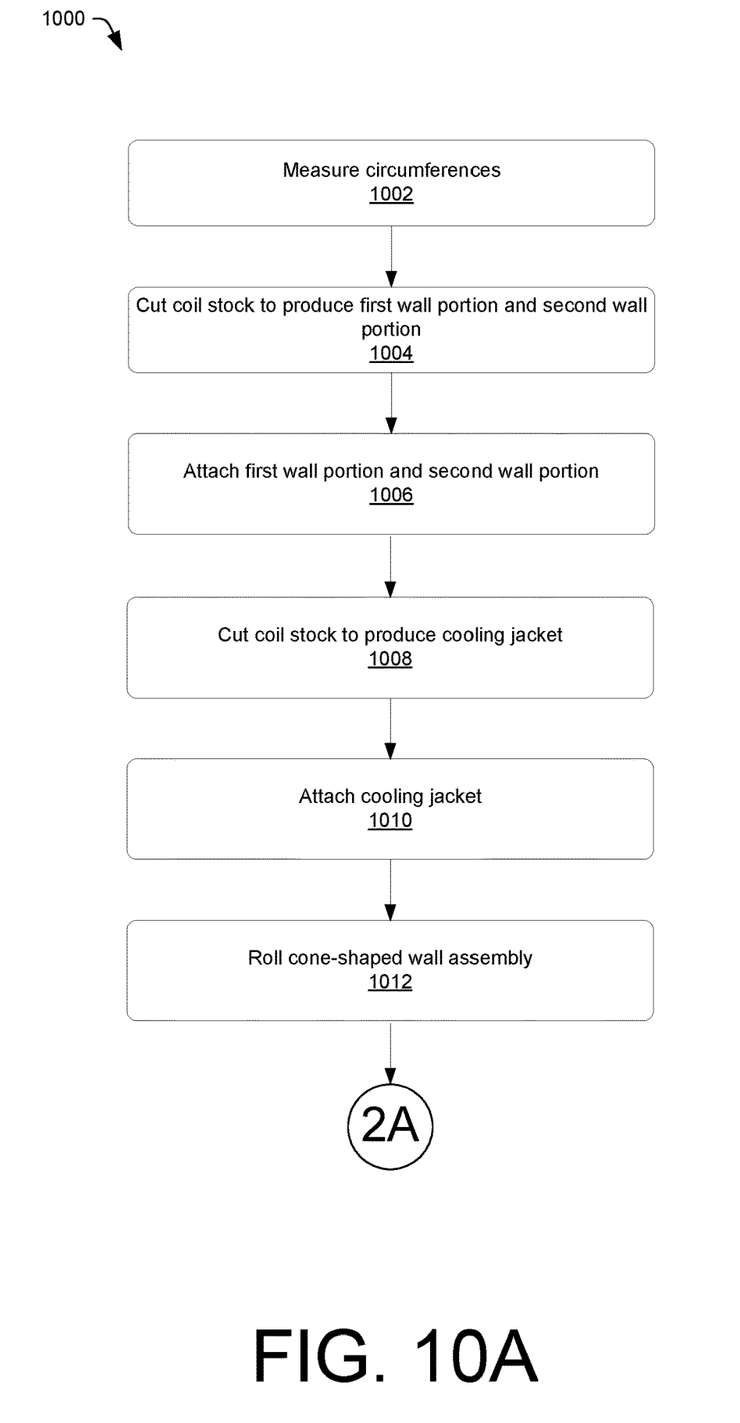
FIGS. 10A-B collectively illustrate a flow diagram illustrating an example process of making the tank shown in FIG. 1.
Figure 10B:
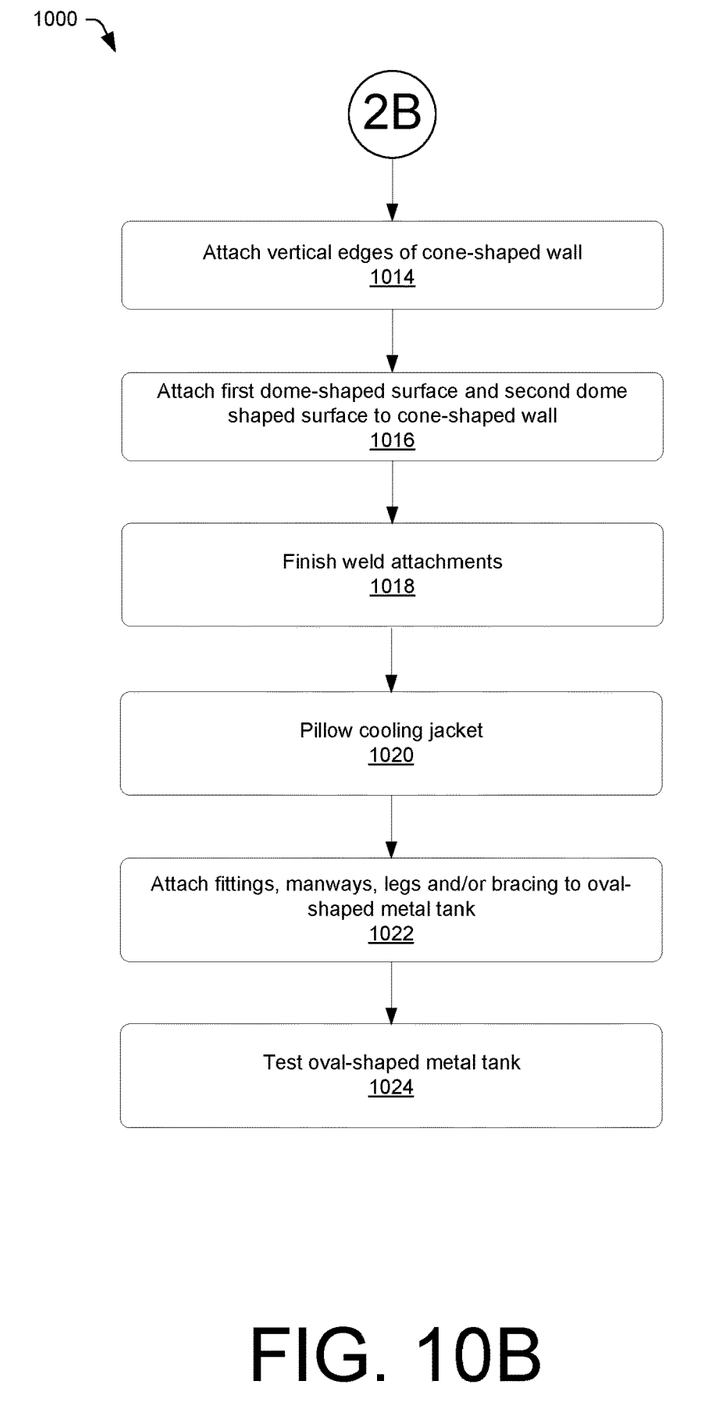

FIGS. 10A-B collectively illustrate an example method 1000 of making an example oval-shaped metal (e.g., tank 102) that, when completed, has an oval shape on an inside surface of the tank that is void of any angled corners. The oval-shaped inside surface provides the smooth arcuate egg-shaped inside surface to displace a product (e.g., product 302) in a torus shaped vortex (e.g., torus shaped vortex 304) that continuously and gently mixes the product void of any dead circulation areas during a fermentation of the product.

Method 1000 may include an operation 1002, which represents measuring a circumference of a first dome-shaped surface (e.g., first dome-shaped surface 106 or 802) formed of steel and measuring a circumference of a second dome-shaped surface (e.g., second dome-shaped surface 108 or 902) formed of steel. For example, operation 1002 may include measuring a circumference of a first dome-shaped surface and a circumference of a second dome-shaped surface that may have been provided by a manufacture (e.g., third party manufacture) of heads for tanks.

Method 1000 may proceed to operation 1004, which represents cutting coil stock to produce a first wall portion (e.g., first wall portion 110 or 402) and a second wall portion (e.g., second wall portion 112 or 502) of the tank. For example, the first wall portion and/or the second wall portion may be laser cut, water jet cut, etc. from a 12-gauge (GA) coil stock of steel (e.g., A240-T304 stainless steel (SS), #4 finish). The first wall portion may be cut from the coil stock based at least in part on the measurement of the circumference of the first dome-shaped surface. For example, a top length (e.g., top length 406) of the first wall portion may be cut from the coil stock to match the circumference of the first dome-shaped surface. The second wall portion may be cut from the coil stock based at least in part on the measurement of the circumference of the second dome-shaped surface. For example, a bottom length (e.g., bottom length 504) of the second wall portion may be cut from the coil stock to match the circumference of the second dome-shaped surface. Operation 1004 may include cutting a bottom length (e.g., bottom length 404) of the first wall portion and cutting a top length (e.g., top length 506) of the second wall portion from the coil stock such that the bottom length of the first wall portion matches the top length of the second wall portion.

Method 1000 may include operation 1006, which represents attaching the first wall portion to the second wall portion. For example, the bottom length of the first wall portion may be attached to the top length of the second wall portion. For example, the bottom length of the first wall portion may be seam welded to the top length of the second wall portion.

Method 1000 may include operation 1008, which represents cutting coil stock to produce a cooling jacket (e.g., cooling jacket 120, cooling jacket 602). For example, the cooling jacket may be laser cut, water jet cut, etc. from a 12-gauge (GA) coil stock of steel (e.g., A240-T304 stainless steel (SS), #4 finish). The cooling jacket may be cut from the coil stock based at least in part on a cone shape (e.g., tapered shape) of the cone-shaped wall (e.g., cone-shaped wall 104). For example, the cooling jacket may be cut from the coil stock to have a narrower top perimeter relative to a bottom perimeter that are equal to a top perimeter (e.g., top perimeter 116) and bottom perimeter (e.g., bottom perimeter 118) of the cone-shaped wall to fit on the cone shape of the exterior surface of the cone-shaped wall.

Method 1000 may include operation 1010, which represents attaching the cooling jacket to the first wall portion. For example, the cooling jacket may be resistance spot welded to the first wall portion. The first wall portion attached to the second wall portion, and the cooling jacket attached to the first wall portion defining a cone-shaped wall assembly (e.g., cone-shaped wall assembly 702).

Method 1000 may be include operation 1012, which represents rolling the cone-shaped wall assembly into a cone shape. For example, the cone-shaped wall assembly may have a substantially planar cross-sectional profile subsequent to the assembly of the cone-shaped assembly, and the planar cone-shaped assembly may be rolled via a needle roller bearing to impart a desired cone shape to the cone-shaped assembly.

FIG. 2B continues the illustration of the method 1000, which may include operation 1014, which represent attaching a first vertical edge of the cone-shaped wall to a second vertical edge of the cone-shaped wall. For example, the first vertical edge of the cone-shaped wall may be welded (e.g., tack welded) to the second vertical edge of the cone-shaped wall. The first vertical edge attached to the second vertical edge defining a seam (e.g., seam 202) of the cone-shaped wall.

Method 1000 may include operation 1016, which represents attaching the first dome-shaped surface and the second dome-shaped surface to the cone-shaped wall. For example, a perimeter (e.g., circumference) of the first dome-shaped surface may be fitted and tack welded to a top perimeter (e.g., top perimeter 116) of the first wall portion of the cone-shaped wall, and a perimeter (e.g., circumference) of the second dome-shaped surface may be fitted and tack welded to a bottom perimeter (e.g., bottom perimeter 118) of the second wall portion of the cone-shaped wall.

Method 1000 may include operation 1018, which represents finish welding the attachments, interfaces, seams, etc. between the first dome-shaped surface, the cone-shaped wall, and the second dome-shaped surface. For example, the first vertical edge of the cone shaped wall may be finished welded to the second vertical edge of the cone-shaped wall, the perimeter of the first dome-shaped surface may be finished welded to the top perimeter of the first wall portion, and the perimeter of the second dome-shape surface may be finished welded to the bottom perimeter of the second wall portion. Operation 1018 may also represent finish welding the cooling jacket to the first wall portion.

Method 1000 may include operation 1020, which represents pillowing the cooling jacket. For example, the cooling jacket that is finish welded to the first wall portion may be inflated to provide about a 0.08-inch gap between the outside surface of the first wall portion and the inside surface of the cooling jacket 120 facing the outside of the first wall portion.

Method 1000 may include operation 1022, which represents attach fittings (e.g., fitting(s) 122), manways (e.g., manway assemblies 124 and 126), legs and/or bracing to the tank. For example, fittings, manways, legs, and/or bracing may be welded to the tank.

Method 1000 may be complete at operation 1024, which represents testing the tank. For example, the tank may be leak tested, pressure tested, corrosion tested, etc.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A tank comprising:
    a first dome-shaped surface being formed of steel and having a perimeter defining a first diameter;
    a second dome-shaped surface opposite the first dome-shaped surface, the second dome-shaped surface being formed of steel and having a perimeter defining a second diameter larger than the first diameter of the first dome-shaped surface; and
    a cone-shaped wall formed of the steel and having a top perimeter opposite a bottom perimeter,
    wherein:
        the top perimeter of the wall is attached to the perimeter of the first dome-shaped surface and defines a top interface void of angled corners on an inside surface of the tank,
        the bottom perimeter of the wall is attached to the perimeter of the second dome-shaped surface and defines a bottom interface void of angled corners on the inside surface of tank, and
        the wall attached to the first dome-shaped surface and the second dome-shaped surface defines an oval-shape void of angled corners on the inside surface of tank such that, when a product contained in the tank is displaced, the product is displaced in a torus shaped vortex between the first dome-shaped surface and the second dome-shaped surface.

2. The tank of claim 1, further comprising a cooling jacket attached to the cone-shaped wall.

3. The tank of claim 2, wherein the cooling jacket is formed of steel.

4. The tank of claim 1, wherein the tank comprises a fermentation tank.

5. The tank of claim 1, further comprising an oxygenation system disposed inside the tank.

6. The tank of claim 5, wherein the oxygenation system comprises a micro-oxygenation system.

7. The tank of claim 1, further comprising a manway assembly attached to the first dome-shaped surface.

8. The tank of claim 1, further comprising a manway assembly attached to the second dome-shaped surface.

9. The tank of claim 1, wherein the cone-shaped wall includes a first wall portion attached to a second wall portion, the first wall portion attached to the second wall portion defining a seam having an elliptical shape.

10. A tank comprising:
    a first dome-shaped surface being formed of steel and having a perimeter defining a first diameter;
    a second dome-shaped surface opposite the first dome-shaped surface, the second dome-shaped surface being formed of the steel and having a perimeter defining a second diameter larger than the first diameter of the first dome-shaped surface;
    a first wall portion formed of the steel and attached to a second wall portion formed of the steel, the first wall portion attached to the second wall portion defining a seam having an elliptical shape, the first wall portion having a top perimeter and the second wall portion having a bottom perimeter opposite the top perimeter,
    wherein:
        the top perimeter of the first wall portion is attached to the perimeter of the first dome-shaped surface,
        the bottom perimeter of the second wall portion is attached to the perimeter of the second dome-shaped surface, and
        the first wall portion attached to the first dome-shaped surface and the second wall portion attached to the second dome-shaped surface defines an oval-shape void of angled corners on the inside surface of tank such that, when a product contained in the tank is displaced, the product is displaced in a torus shaped vortex between the first dome-shaped surface and the second dome-shaped surface.

11. The tank of claim 10, further comprising a cooling jacket attached to the first wall portion.

12. The tank of claim 11, wherein the cooling jacket is formed of the steel.

13. The tank of claim 10, wherein the tank comprises a fermentation tank.

14. The tank of claim 10, further comprising an oxygenation system disposed inside the tank.

15. The tank of claim 14, wherein the oxygenation system comprises a micro-oxygenation system.

16. The tank of claim 10, further comprising a manway assembly attached to the first dome-shaped surface.

17. The tank of claim 10, further comprising a manway assembly attached to the second dome-shaped surface.

18. A tank comprising:
    a first dome-shaped surface being formed of steel;
    a second dome-shaped surface opposite the first dome-shaped surface, the second dome-shaped surface being formed of the steel; and
    a cone-shaped wall formed of the steel and attached between the first dome-shaped surface and the second dome-shaped surface,
    wherein the cone-shaped wall attached between the first dome-shaped surface and the second dome-shaped surface defines an oval-shape void of angled corners on the inside surface of tank such that when a product contained in the tank is displaced, the product is displaced in a torus shaped vortex between the first dome-shaped surface and the second dome-shaped surface.

19. The tank of claim 18, further comprising a cooling jacket formed of steel and attached to the cone-shaped wall.

20. The tank of claim 18, wherein the tank is a fermentation tank.

* * * * *